US010508611B2

(12) United States Patent
Nakamura et al.

(10) Patent No.: US 10,508,611 B2
(45) Date of Patent: Dec. 17, 2019

(54) CONTROL DEVICE AND CONTROL METHOD FOR INTERNAL COMBUSTION ENGINE

(71) Applicant: HITACHI AUTOMOTIVE SYSTEMS, LTD., Hitachinaka-shi, Ibaraki (JP)

(72) Inventors: Yoshitatsu Nakamura, Isesaki (JP); Tomoyuki Murakami, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/119,834

(22) PCT Filed: Sep. 16, 2014

(86) PCT No.: PCT/JP2014/074445
§ 371 (c)(1),
(2) Date: Aug. 18, 2016

(87) PCT Pub. No.: WO2015/125326
PCT Pub. Date: Aug. 27, 2015

(65) Prior Publication Data
US 2017/0058819 A1    Mar. 2, 2017

(30) Foreign Application Priority Data
Feb. 19, 2014    (JP) .................... 2014-029409

(51) Int. Cl.
*F02D 41/30* (2006.01)
*F02D 41/06* (2006.01)
(Continued)

(52) U.S. Cl.
CPC ....... *F02D 41/3082* (2013.01); *F02D 41/042* (2013.01); *F02D 41/065* (2013.01);
(Continued)

(58) Field of Classification Search
CPC .. F02D 41/3082; F02D 41/042; F02D 41/065; F02D 41/34; F02D 220/0606; F02D 2250/02; Y02T 10/44
(Continued)

(56) References Cited

U.S. PATENT DOCUMENTS 4,920,942 A * 5/1990 Fujimori ............. F02D 41/3082
123/494
4,951,636 A * 8/1990 Tuckey ................. F02D 33/006
123/41.31
(Continued)

FOREIGN PATENT DOCUMENTS

JP    2004-293354 A    10/2004
JP    2006-161694 A     6/2006
(Continued)

OTHER PUBLICATIONS

Japanese Office Action dated Dec. 19, 2017 as issued in corresponding Japanese Application No. 2014-029409 and its partial English translation thereof.
(Continued)

*Primary Examiner* — Stephen K Cronin
*Assistant Examiner* — Susan E Scharpf
(74) *Attorney, Agent, or Firm* — Foley & Lardner LLP

(57) ABSTRACT

The present invention relates to a control device and a control method for an internal combustion engine including a fuel injection valve and an electric fuel pump. In stopping the internal combustion engine, the control device stops driving of the fuel pump and then fuel injection by the fuel injection valve, and increases the total amount of fuel injection by the fuel injection valve after stopping of driving of the fuel pump as the temperature of fuel in stopping the internal combustion engine decreases, thereby reducing a fuel pressure in a stop period. In this manner, fuel leakage
(Continued)

from the fuel injection valve in the stop period can be reduced with a simple configuration.

9 Claims, 6 Drawing Sheets

(51) Int. Cl.
    *F02D 41/04*     (2006.01)
    *F02D 41/34*     (2006.01)

(52) U.S. Cl.
    CPC ...... *F02D 41/34* (2013.01); *F02D 2200/0606* (2013.01); *F02D 2250/02* (2013.01); *Y02T 10/44* (2013.01)

(58) Field of Classification Search
    USPC .......................................... 123/457; 701/103
    See application file for complete search history.

(56) References Cited

U.S. PATENT DOCUMENTS

| | | | | |
|---|---|---|---|---|
| 5,351,548 A * | 10/1994 | Briggs | ................. | G01L 9/0075 73/114.43 |
| 5,465,703 A * | 11/1995 | Abe | ................. | F02D 41/004 123/520 |
| 5,797,374 A * | 8/1998 | Minagawa | ............ | F02D 41/042 123/198 DB |
| 6,604,502 B1 * | 8/2003 | Bisaro | ................. | F02D 41/042 123/198 DB |
| 6,959,697 B2 * | 11/2005 | Kojima | ................. | F02D 41/042 123/467 |
| 7,287,501 B2 * | 10/2007 | Yamada | ................. | F02D 41/042 123/179.4 |
| 7,316,219 B2 * | 1/2008 | Yamaguchi | ........... | B60W 10/06 123/304 |
| 7,458,362 B2 * | 12/2008 | Hazama | ............. | F02M 37/0029 123/457 |
| 7,543,575 B2 * | 6/2009 | Wolber | ................. | F02M 31/125 123/549 |
| 8,333,175 B2 * | 12/2012 | Nishio | ............... | F02M 37/0029 123/458 |
| 2006/0118075 A1 | 6/2006 | Yamada | | |
| 2006/0207567 A1 | 9/2006 | Yamaguchi et al. | | |
| 2009/0177372 A1 | 7/2009 | Akita et al. | | |

FOREIGN PATENT DOCUMENTS

| | | |
|---|---|---|
| JP | 2006-258032 A | 9/2006 |
| JP | 2007-285128 A | 11/2007 |

OTHER PUBLICATIONS

International Search Report and Japanese language Written Opinion of the International Searching Authority dated Dec. 22, 2014 issued in International Application No. PCT/JP2014/074445.

Japanese Office Action dated Jun. 6, 2017 as issued in corresponding Japanese Application No. 2014-029409 and its partial English translation thereof.

Japanese Office Action dated Nov. 6, 2018 as issued in corresponding Japanese Application No. 2014-029409 and its partial English translation thereof.

* cited by examiner

CONTROL DEVICE AND CONTROL METHOD FOR INTERNAL COMBUSTION ENGINE

TECHNICAL FIELD

The present invention relates to a control device and a control method for an internal combustion engine including a fuel injection valve and an electric fuel pump for pumping fuel to the fuel injection valve.

BACKGROUND ART

Patent Document 1 discloses a control device for a vehicle in which at the end of vehicle operation, the fuel pressure is reduced in each of a high-pressure delivery pipe and a low-pressure delivery pipe by opening an electromagnetic relief valve and by stopping operation of a low-pressure fuel pump. This prevents deterioration in emission performance at the next engine start attributable to fuel leakage from an injector during an operation stop period.

REFERENCE DOCUMENT LIST

Patent Document

Patent Document 1: Japanese Patent Application Laid-open Publication No. 2006-258032

SUMMARY OF THE INVENTION

Problem to be Solved by the Invention

In a configuration in which an electromagnetic relief valve is provided to reduce fuel leakage from a fuel injection valve in an operation stop period of an internal combustion engine so that a fuel pressure in a fuel pipe is reduced by actuation of the electromagnetic relief valve, there arises a problem of an increase in costs due to the addition of the electromagnetic relief valve.

The present invention has been made in view of the foregoing problem, and has an object of providing a control device and a control method for an internal combustion engine that can reduce fuel leakage from the fuel injection valve in the operation stop period of the internal combustion engine with a simple configuration.

Means for Solving the Problems

To achieve the object, a control device for an internal combustion engine according to the present invention stops fuel injection by a fuel injection valve after stopping of driving of a fuel pump in stopping the internal combustion engine.

A control method for an internal combustion engine according to the present invention is a control method for an internal combustion engine including a fuel injection valve and an electric fuel pump that pumps fuel to the fuel injection valve, and includes the steps of: stopping driving of the fuel pump in stopping an operation of the internal combustion engine; and stopping fuel injection by the fuel injection valve after stopping driving of the fuel pump.

Effects of the Invention

According to the present invention described above, the fuel pressure in the fuel pipe can be reduced by performing fuel injection by the fuel injection valve in a state where driving of the fuel pump is stopped so that no fuel is supplied to the fuel pipe. Thus, fuel leakage from the fuel injection valve in the operation stop period can be reduced without using a device for reducing the fuel pressure, such as an electromagnetic relief valve.

BRIEF DESCRIPTION OF THE DRAWINGS

FIG. 4A is a time chart of a characteristic at low temperature, and FIG. 4B is a time chart of a characteristic at high temperature.

FIG. 6A is a time chart of a characteristic at low temperature, and FIG. 6B is a time chart of a characteristic at high temperature.

MODE FOR CARRYING OUT THE INVENTION

An embodiment of the present invention will be described hereinafter.

Figure 1:
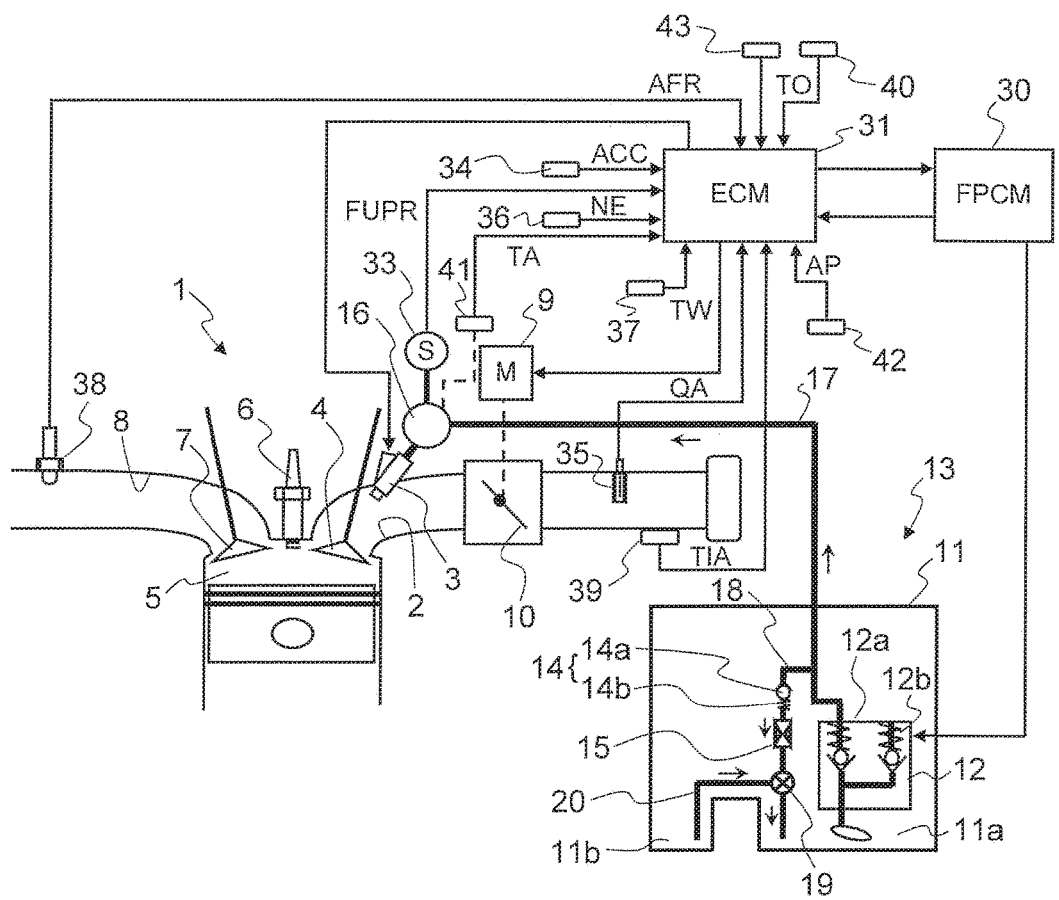
FIG. 1 is a system configuration diagram of an internal combustion engine according to an embodiment of the present invention.

FIG. 1 illustrates an example of an internal combustion engine to which a control device and a control method according to the present invention are applied.

An internal combustion engine 1 is an engine mounted as a power source on a vehicle and includes a fuel injection valve 3 in an intake pipe 2 upstream of an intake valve 4 of each cylinder. Fuel injection valve 3 is controlled to intermittently inject fuel into intake pipe 2 at an injection timing corresponding to each stroke of the cylinder.

Fuel injected by fuel injection valve 3 into intake pipe 2 is sucked into a combustion chamber 5 through intake valve 4 together with air to form an air-fuel mixture. The air-fuel mixture in combustion chamber 5 is ignited and burns by a spark from an ignition plug 6.

A combustion gas in combustion chamber 5 is discharged to an exhaust pipe 8 through an exhaust valve 7.

An electronically controlled throttle 10 adjusts the amount of intake air of internal combustion engine 1 by changing an opening degree with a throttle motor 9. Electronically controlled throttle 10 is disposed in an air intake duct shared by cylinders upstream of a portion where fuel injection valve 3 of intake pipe 2 is disposed.

A fuel supply device 13 is a device that pumps fuel in a fuel tank 11 to fuel injection valve 3 with a fuel pump 12.

Fuel supply device 13 includes fuel tank 11, fuel pump 12, a pressure regulating valve 14, an orifice 15, a fuel gallery pipe 16, a fuel supply pipe 17, a fuel return pipe 18, a jet pump 19, and a fuel transfer pipe 20.

Fuel pump 12 is an electric pump and disposed in fuel tank 11.

Fuel pump 12 incorporates a check valve 12a for preventing a backflow of discharged fuel and a relief valve 12b that opens when a discharge pressure of fuel pump 12 exceeds an upper limit and relieves fuel discharged from fuel pump 12 into fuel tank 11.

Each of check valve 12a and relief valve 12b is a mechanical valve that displaces a valve body between an open position and a closed position by using front-and-back differential pressure.

Fuel supply pipe 17 is a pipe connecting fuel pump 12 and fuel gallery pipe 16. An end of the fuel supply pipe 17 is connected to a discharge port of fuel pump 12, and the other end of fuel supply pipe 17 is connected to fuel gallery pipe 16.

A fuel supply port of fuel injection valve 3 of each cylinder is connected to fuel gallery pipe 16 so that fuel is distributed to fuel injection valve 3 of each cylinder through fuel gallery pipe 16.

Fuel return pipe 18 is branched off and extends from fuel supply pipe 17 in fuel tank 11. An end of fuel return pipe 18 is open in fuel tank 11.

In fuel return pipe 18, pressure regulating valve 14, orifice 15, and jet pump 19 are arranged in this order from the upstream side.

Pressure regulating valve 14 is a mechanical valve including a valve body 14a that opens and closes fuel return pipe 18 and an elastic member 14b such as a coil spring that presses valve body 14a toward a valve seat on an upstream side of fuel return pipe 18.

Pressure regulating valve 14 opens when a fuel pressure in fuel supply pipe 17 and fuel gallery pipe 16, that is, a fuel pressure supplied to fuel injection valve 3, exceeds a set pressure, whereas pressure regulating valve 14 closes when the fuel pressure is the set pressure or less. In this manner, pressure regulating valve 14 adjusts a relief amount of fuel so as to prevent the fuel pressure in the fuel pipe from decreasing below the set pressure.

Jet pump 19 transfers fuel by using a flow of fuel that returns into fuel tank 11 through pressure regulating valve 14 and orifice 15.

Fuel tank 11 is a saddle-shaped fuel tank whose bottom surface is partially humped to partition bottom space into two regions 11a and 11b. A suction port of fuel pump 12 is open in region 11a. Thus, fuel in region 11b remains unless fuel in region 11b is transferred to region 11a.

In view of this, jet pump 19 applies a negative pressure to fuel transfer pipe 20 by using a flow of fuel that returns into region 11a of fuel tank 11 through pressure regulating valve 14 and orifice 15 so that fuel in region 11b in which fuel transfer pipe 20 is open is guided to jet pump 19 through fuel transfer pipe 20 to be discharged to region 11a together with the returned fuel. That is, redundant fuel is discharged from fuel pump 12, and using the redundant fuel returned to fuel tank 11, fuel transfer in fuel tank 11 is performed.

In this embodiment, jet pump 19 is provided as described above. In a case where fuel tank 11 does not have the saddle shape, that is, in a case where the bottom space of fuel tank 11 is not partitioned and fuel in fuel tank 11 can be sucked from the suction port of fuel pump 12 without a remainder, however, jet pump 19 and fuel transfer pipe 20 may be omitted.

An engine control module (ECM) 31 including a microcomputer is a control device that outputs an injection pulse signal for controlling an injection operation by fuel injection valve 3. ECM 31 further has a function of controlling, for example, an ignition timing with ignition plug 6 and an opening degree of electronically controlled throttle 10.

A fuel pump control module (FPCM) 30 including a microcomputer controls fuel pump 12 by outputting a drive signal to fuel pump 12.

ECM 31 and FPCM 30 constituting the control device for internal combustion engine 1 are configured to communicate with each other. ECM 31 transmits, for example, a signal instructing a duty ratio in PWM control of fuel pump 12 to FPCM 30.

FPCM 30 transmits, for example, a signal indicating a result of fault diagnosis on, for example, fuel pump 12 and a driving circuit of fuel pump 12 to ECM 31.

ECM 31 receives signals output from sensors for detecting an operating state of internal combustion engine 1.

Examples of such sensors include a fuel pressure sensor 33 for detecting a fuel pressure FUPR in fuel gallery pipe 16, an accelerator position sensor 34 for detecting a depression amount of an unillustrated accelerator pedal, that is, an accelerator position ACC, an airflow sensor 35 for detecting an intake air flow rate QA of internal combustion engine 1, a rotation sensor 36 for detecting a rotation speed NE of internal combustion engine 1, a water temperature sensor 37 for detecting a cooling water temperature TW of internal combustion engine 1, an air-fuel ratio sensor 38 for detecting an air-fuel ratio AFR of internal combustion engine 1 based on an oxygen concentration in exhaust gas, an intake air temperature sensor 39 for detecting an intake air temperature TIA of internal combustion engine 1, an oil temperature sensor 40 for detecting a temperature TO of lubricating oil of internal combustion engine 1, and a fuel temperature sensor 41 for detecting a temperature TF of fuel in fuel gallery pipe 16.

ECM 31 receives, for example, an output signal of an atmospheric pressure sensor 42 for detecting an atmospheric pressure AP and an on/off signal of an ignition switch 43 for instructing operation/stop of internal combustion engine 1.

Based on engine operating conditions such as an engine load and engine rotation speed NE, ECM 31 calculates an ignition timing and controls electrification to an unillustrated ignition coil so that spark discharge is performed by ignition plug 6 at the ignition timing.

ECM 31 calculates a target opening degree of electronically controlled throttle 10 based on engine operating conditions such as accelerator position ACC and controls throttle motor 9 so that the opening degree of electronically controlled throttle 10 approaches the target opening degree.

In addition, ECM 31 determines a duty ratio [%] in PWM control of fuel pump 12, and transmits a pulse signal indicating this duty ratio to FPCM 30 as a driving instruction signal of fuel pump 12.

In the system illustrated in FIG. 1, the amount of fuel to be relieved is restricted by orifice 15 so that the fuel pressure in the fuel pipe can be kept higher than a set pressure of pressure regulating valve 14.

Thus, ECM 31 can determine a duty ratio in PWM control of fuel pump 12 according to a fuel pressure FUPR detected by fuel pressure sensor 33 and a target fuel pressure (target fuel pressure≥set pressure of pressure regulating valve 14) that has been set based on operating conditions of internal combustion engine 1.

ECM 31 sets the target fuel pressure at a value satisfying a relationship "target fuel pressure≥set pressure of pressure regulating valve 14."

The system can be configured to maintain the fuel pressure in the fuel pipe around a set pressure of pressure regulating valve 14. In this case, ECM 31 can determine a duty ratio in PWM control of fuel pump 12 depending on operating conditions such as an engine load and an engine rotation speed so as to avoid an unnecessary operation of fuel pump 12 due to relief of an excessive amount of fuel through pressure regulating valve 14, and can also provide the duty ratio as a fixed value.

Based on the duty ratio indicated by ECM 31, FPCM 30 performs PWM control of electrification to a motor of fuel pump 12.

ECM 31 may include a circuit and a control function of FPCM 30 so that ECM 31 and FPCM 30 can be integrated as a control device.

ECM 31 calculates an injection pulse width TI [ms] of an injection pulse signal for controlling an valve open period of fuel injection valve 3 based on engine operating conditions such as intake air flow rate QA, engine rotation speed NE, cooling water temperature TW, air-fuel ratio AFR, and fuel pressure FUPR.

When ECM 31 detects a fuel injection timing of each cylinder, ECM 31 outputs an injection pulse signal with injection pulse width TI to fuel injection valve 3 of a cylinder at a fuel injection timing, thereby controlling the fuel injection amount and the injection timing by fuel injection valve 3. Fuel injection valve 3 opens only in a period corresponding to injection pulse width TI, and injects fuel in an amount proportional to the valve open period [ms].

In addition, to reduce fuel leakage from fuel injection valve 3 in a stop period of internal combustion engine 1, ECM 31 performs a process of reducing a fuel pressure in a fuel pipe between fuel pump 12 and fuel injection valve 3 to a level below a set pressure of pressure regulating valve 14 when internal combustion engine 1 is stopped. The process of reducing the fuel pressure described above will be hereinafter also referred to as a fuel pressure reduction process.

That is, based on an instruction of stopping internal combustion engine 1, fuel injection of fuel injection valve 3 stops. Furthermore, when driving of fuel pump 12 stops, the fuel pressure in the fuel pipe is kept at the set pressure of pressure regulating valve 14. If the fuel pressure in the fuel pipe can be reduced to a level below the set pressure, however, fuel leakage from fuel injection valve 3 in the stop period can be further reduced, and thus, emission performance in the next start of internal combustion engine 1 can be enhanced.

Figure 2:
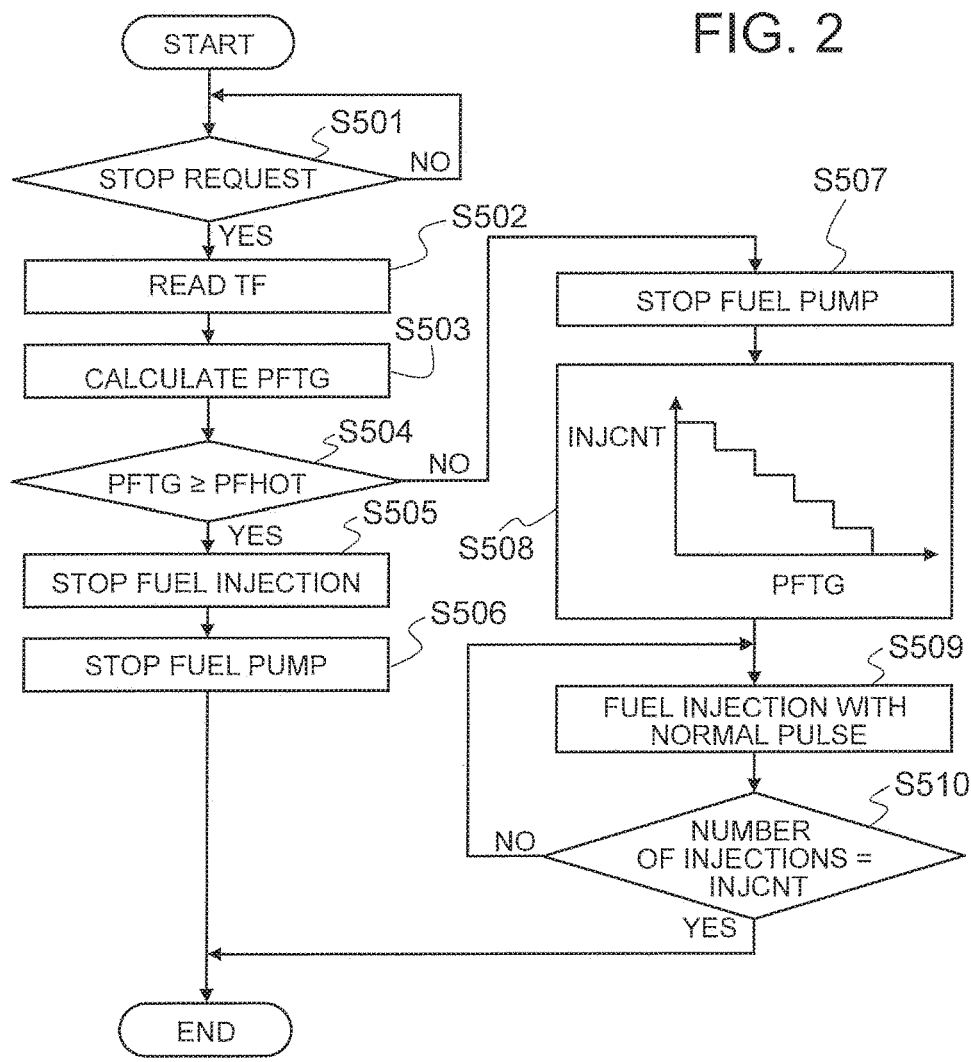
FIG. 2 is a flowchart of a process in stopping of the internal combustion engine according to the embodiment of the present invention.

The flowchart of FIG. 2 illustrates an example of the fuel pressure reduction process by ECM 31.

ECM 31 is configured in such a manner that ECM 31 receives power even when ignition switch 43 is switched from on to off and stops the power supply by itself after finishing a predetermined process in stopping internal combustion engine 1.

In step S501, ECM 31 determines whether a stop request of internal combustion engine 1 occurs or not.

Here, when ignition switch 43 is switched from on to off, ECM 31 can determine occurrence of the stop request of internal combustion engine 1.

In a case where ECM 31 has an idle reduction function of temporarily stopping internal combustion engine 1 in a state of waiting for a traffic light of a vehicle, for example, a stop request of internal combustion engine 1 by this idle reduction function is not included in the stop request in step S501.

This is because the stop period of internal combustion engine 1 is short in the process of temporarily stopping internal combustion engine 1 by the idle reduction function, and the amount of fuel leakage from fuel injection valve 3 in this stop period is sufficiently small. In addition, to restart internal combustion engine 1 quickly, reduction of the fuel pressure is preferably suppressed.

In a case where there is no stop request of internal combustion engine 1 and an operation of internal combustion engine 1 continues, the fuel pressure reduction process is unnecessary, and thus, ECM 31 does not proceed to the process of step S502 and subsequent processes, and the determination process in step S501 is repeated.

On the other hand, if ECM 31 determines that the stop request of internal combustion engine 1 occurs, ECM 31 proceeds to step S502 and reads a fuel temperature TF.

ECM 31 can detect fuel temperature TF based on an output signal from fuel temperature sensor 41 and estimate fuel temperature TF based on operating conditions of internal combustion engine 1.

ECM 31 can estimate fuel temperature TF based on cooling water temperature TW, oil temperature TO, and an engine load before stopping, and can correct the estimated value of fuel temperature TF estimated based on, for example, cooling water temperature TW, based on intake air temperature TIA, an outdoor-air temperature, an atmospheric pressure, and other parameters.

After ECM 31 has read fuel temperature TF in step S502, ECM 31 proceeds to step S503 and calculates a target value PFTG of a fuel pressure in the stop period of internal combustion engine 1.

Figure 3:
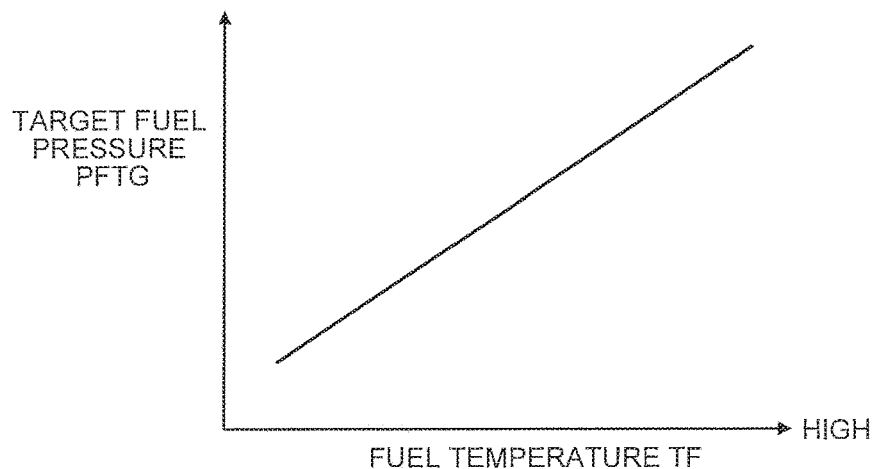
FIG. 3 is a graph indicating a correlation between a fuel temperature and a target fuel pressure PFTG during a stop period in the embodiment of the present invention.

As illustrated in FIG. 3, ECM 31 sets target fuel pressure PFTG at a higher level as fuel temperature TF read in step S502 increases. In other words, the degree of decrease of the fuel pressure from the set pressure of pressure regulating valve 14 decreases as fuel temperature TF increases, and the degree of decrease of the fuel pressure increases as fuel temperature TF decreases.

This is because the decrease of the fuel pressure causes fuel vapor to be more easily generated in the fuel pipe as fuel temperature TF increases, and the fuel vapor generated in the fuel pipe causes a decrease in measurement accuracy of fuel by fuel injection valve 3, that is, a change in correlation between an injection pulse width and the amount of actually injected fuel, which leads to a starting failure.

In view of this, in ECM 31, the degree of decrease of the fuel pressure is reduced as fuel temperature TF increases so that the fuel pressure in the stop period is minimized with suppression of generation of fuel vapor so that the amount of fuel leakage can be reduced.

When target fuel pressure PFTG in the stop period is set in step S503, ECM 31 proceeds to step S504, and determines whether target fuel pressure PFTG set in step S503 is greater than or equal to a previously stored thermal resistance fuel pressure PFHOT or not.

Thermal resistance fuel pressure PFHOT is a threshold for comparison with target fuel pressure PFTG in order to determine whether to perform the fuel pressure reduction process or not.

Here, a state where target fuel pressure PFTG needs to be higher than thermal resistance fuel pressure PFHOT is a state where a decrease of the fuel pressure below the set pressure of pressure regulating valve 14 might cause a starting failure due to generation of fuel vapor at start under thermal resistance conditions. On the other hand, a state where target fuel pressure PFTG needs to be lower than thermal resistance fuel pressure PFHOT, generation of fuel vapor is suppressed at start under thermal resistance conditions so that stable startability can be obtained even with a decrease of the fuel pressure below the set pressure of pressure regulating valve 14. Thus, thermal resistance fuel pressure PFHOT is previously set to perform such conditional determination.

If ECM 31 determines that target fuel pressure PFTG is thermal resistance fuel pressure PFHOT or more, ECM 31 proceeds to step S505, and based on the stop request of internal combustion engine 1, first stops fuel injection by fuel injection valve 3.

Then, ECM 31 proceeds to step S506, and stops driving of fuel pump 12, that is, stops power supply to fuel pump 12, after the stopping of fuel injection by fuel injection valve 3, and terminates a process concerning fuel supply in stopping internal combustion engine 1.

The stopping of driving of fuel pump 12 is performed by, for example, turning off a power supply relay for blocking power supply to a driving circuit of a pump motor.

The timing when driving of fuel pump 12 is stopped after stopping of fuel injection is, for example, a predetermined timing after a lapse of time from when fuel injection is stopped or when rotation of internal combustion engine 1 stops.

In the case of performing the processes of step S505 and step S506, discharge of fuel from fuel pump 12 is stopped after stopping of fuel injection. Thus, the fuel pressure does not decrease below the set pressure of pressure regulating valve 14, and the fuel pressure in the stop period of internal combustion engine 1 is kept around the set pressure of pressure regulating valve 14.

In the manner as described above, in the case where the fuel pressure in the stop period of internal combustion engine 1 is kept around the set pressure of pressure regulating valve 14, the effect of reducing fuel leakage from fuel injection valve 3 in the stop period decreases, as compared to the case of reducing the fuel pressure, but occurrence of a starting failure due to generation of fuel vapor can be suppressed.

On the other hand, if ECM 31 determines that target fuel pressure PFTG is lower than thermal resistance fuel pressure PFHOT in step S504, ECM 31 proceeds to step S507, and stops driving of fuel pump 12 before stopping of fuel injection by fuel injection valve 3.

The stopping of driving of fuel pump 12 is performed by, for example, turning off a power supply relay provided on a power supply line for supplying power to fuel pump 12. In addition, an on-duty in PWM control of fuel pump 12 may be reduced to a predetermined value to stop driving of fuel pump 12.

As will be described later, since ECM 31 stops fuel injection by fuel injection valve 3 after stopping of driving of fuel pump 12 in step S507, there occurs a period in which fuel injection by fuel injection valve 3 is performed with driving of fuel pump 12 stopped, that is, a period in which fuel is withdrawn from a fuel pipe without supply of fuel to the fuel pipe. In this manner, the fuel pressure in the fuel pipe decreases, and as the total amount of fuel injected from fuel injection valve 3 increases with driving of fuel pump 12 stopped, the fuel pressure decreases more greatly.

The total amount of fuel injected from fuel injection valve 3 with driving of fuel pump 12 stopped varies depending on the number of injections, the amount of injection at each injection, and a duration of fuel injection, for example.

When ECM 31 stops driving of fuel pump 12 in step S507, ECM 31 proceeds to step S508, and sets a target injection number INJCNT of fuel injection valve 3 after stopping of driving of fuel pump 12 depending on target fuel pressure PFTG.

Target injection number INJCNT is a target value of a cumulative number of fuel injections after stopping of driving of fuel pump 12.

Here, as target fuel pressure PFTG decreases, the degree of decrease of the pressure from the set pressure of pressure regulating valve 14 increases. The fuel pressure decreases as the cumulative number of fuel injections with driving of fuel pump 12 stopped increases.

In view of this, ECM 31 sets target injection number INJCNT at a larger value as target fuel pressure PFTG decreases.

Specifically, target injection number INJCNT is a cumulative number of fuel injections required for reducing the fuel pressure to target fuel pressure PFTG, and target fuel pressure PFTG is set at a lower level as the fuel temperature decreases. Thus, as the fuel temperature decreases, target injection number INJCNT is set at a larger number.

After ECM 31 has set target injection number INJCNT in step S508, ECM 31 proceeds to step S509 and performs fuel injection by fuel injection valve 3.

In the case of performing fuel injection in step S509, in a manner similar to that in an operation period of internal combustion engine 1, ECM 31 calculates injection pulse width TI for defining a fuel injection amount at each injection based on engine operating conditions such as intake air flow rate QA and engine rotation speed NE. Fuel injected from fuel injection valve 3 with fuel injection control in step S509 is ignited and burns in a combustion chamber of each cylinder by spark ignition performed with ignition control that continues after an engine stop request has issued.

ECM 31 then proceeds to step S510, and determines whether the cumulative number of fuel injections after stopping of driving of fuel pump 12 has reached target injection number INJCNT or not.

If the cumulative number of fuel injections after stopping of driving of fuel pump 12 is smaller than target injection number INJCNT, that is, if it is estimated that an actual fuel pressure does not decrease to target fuel pressure PFTG (PFTG<set pressure of pressure regulating valve 14), ECM 31 returns to the process of step S509 to continue fuel injection.

On the other hand, when the cumulative number of fuel injections after stopping of driving of fuel pump 12 reaches target injection number INJCNT, ECM 31 estimates that the fuel pressure in the fuel pipe has decreased to target fuel pressure PFTG, and finishes a process concerning fuel supply in stopping internal combustion engine 1, that is, a fuel pressure reduction process, by stopping fuel injection.

As described above, in a case where the fuel pressure in the fuel pipe is reduced below the set pressure of pressure regulating valve 14 in stopping internal combustion engine 1, fuel leakage from fuel injection valve 3 in the stop period of internal combustion engine 1 can be reduced, as compared to a case where the fuel pressure is kept at the set pressure of pressure regulating valve 14. The reduction of the fuel leakage amount in the stop period can reduce the amount of discharge of unburned fuel in the next start of internal combustion engine 1 so that emission performance can be enhanced.

Since the fuel leakage amount can be reduced by reducing the fuel pressure, oil-tight performance required for fuel injection valve 3 can be reduced as compared to a case where the fuel pressure is kept at the set pressure of pressure regulating valve 14. Consequently, costs for fabricating fuel injection valve 3 can be reduced.

In addition, since no electronically controlled devices such as an electromagnetic relief valve are used for reducing the fuel pressure in the fuel pipe, the fuel pressure in the fuel pipe can be reduced without an increase in system costs.

The process of setting the degree of decrease of the fuel pressure variable depending on a fuel temperature in stopping internal combustion engine 1 may be omitted, and alternatively, a uniform target fuel pressure PFTG may be set.

In the case of providing fuel pressure sensor 33, fuel pressure sensor 33 detects a pressure decrease by fuel injection after stopping of driving of fuel pump 12, and a change in fuel pressure by fuel injection after stopping of driving of fuel pump 12 is large. In a case where fuel injection is stopped by determining whether the fuel pressure reaches target fuel pressure PFTG or not based on an output of fuel pressure sensor 33, the timing when fuel injection finishes greatly varies so that it is difficult to obtain the advantage of reducing the fuel leakage amount with stability.

On the other hand, with the configuration in which the degree of decrease of the fuel pressure is controlled using the cumulative number of fuel injections, the timing when fuel injection finishes is stabilized by previously obtaining a correlation between the cumulative number of fuel injections and an achieved fuel pressure so that the advantage of reducing the fuel leakage amount can be obtained with stability.

Figure 4A:
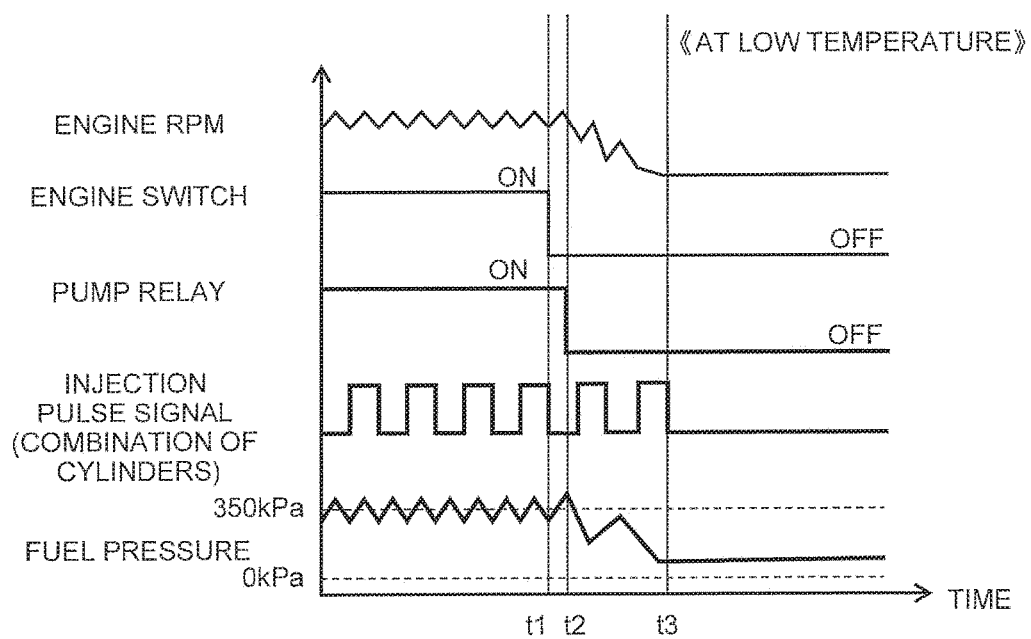
FIGS. 4A and 4B are time charts for describing process characteristics in stopping the internal combustion engine according to the embodiment of the present invention.
Figure 4B:
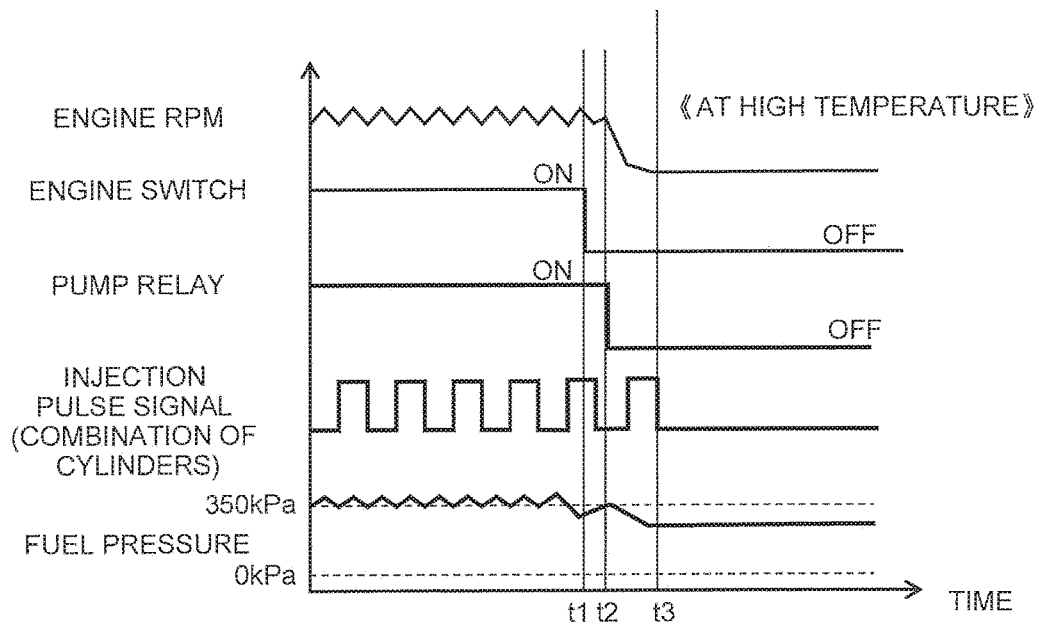

The time charts of FIGS. 4A and 4B illustrate examples of changes in an engine rotation speed, an ignition switch, a pump power supply relay, an injection pulse signal, and a fuel pressure in a case where the processes indicated in the flowchart of FIG. 2 are performed by ECM 31. FIG. 4A illustrates an example of a characteristic in a state where the fuel temperature is lower than that in FIG. 4B. FIG. 4B illustrates an example of a characteristic in a state where the fuel temperature is higher than that in FIG. 4A.

In FIGS. 4A and 4B, when the ignition switch is switched from on to off at time t1 and a stop request of internal combustion engine 1 is issued, the pump power supply relay is switched from on to off at time t2, and then, an output of an injection pulse signal is stopped at time t3 so that fuel injection by fuel injection valve 3 is stopped.

That is, in a period from time t2 to time t3, fuel injection by fuel injection valve 3 is performed with fuel pump 12 stopped. In this period, the fuel pressure gradually decreases from a level around a target fuel pressure in an engine operating period. Since the number of injections with fuel pump 12 stopped is set at a larger value as the fuel temperature decreases, as the fuel temperature decreases, a period from stopping of the pump to stopping of fuel injection increases, and the number of injections in the period from time t2 to time t3 increases. Thus, as the fuel temperature decreases, the degree of decrease of the fuel pressure increases, and the fuel pressure in an engine stop period decreases.

Then, when the fuel injection is stopped at time t3, the decrease of the fuel pressure converges, and the fuel pressure is kept around the fuel pressure at time t3 in a subsequent operation stop period of internal combustion engine 1.

In the processes indicated in the flowchart of FIG. 2, ECM 31 sets target fuel pressure PFTG in the stop period depending on the fuel temperature, and sets the number of injections after stopping of the pump depending on target fuel pressure PFTG that has been set. Alternatively, the total amount of fuel injection after stopping of the pump may be increased so that the fuel pressure can be further reduced.

Thus, instead of changing the number of injections after stopping of the pump depending on target fuel pressure PFTG, the amount of injection at each injection after stopping of the pump may be changed depending on target fuel pressure PFTG so that the degree of decrease of the fuel pressure can be controlled.

Figure 5:
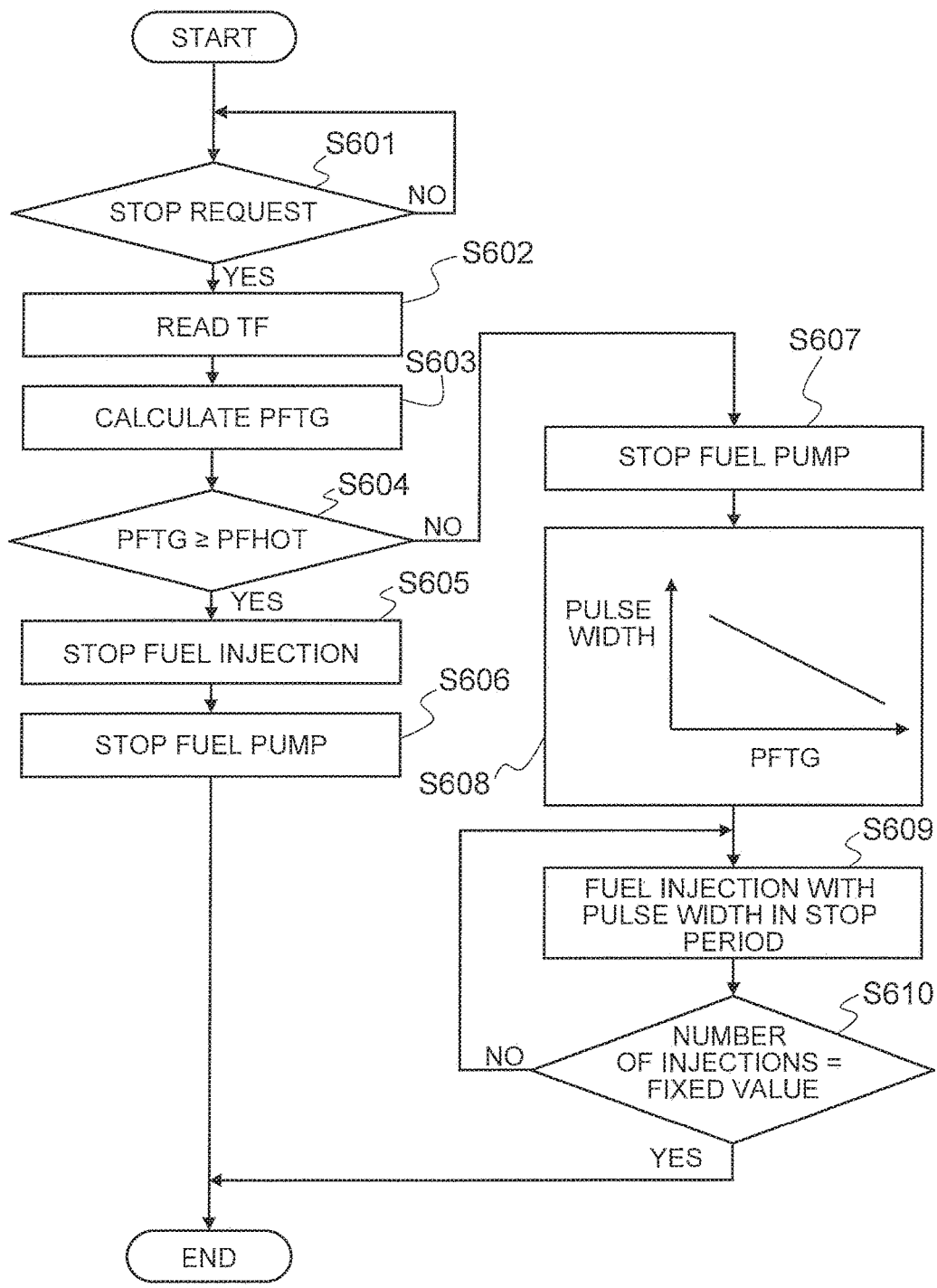
FIG. 5 is a flowchart of a process in stopping the internal combustion engine according to the embodiment of the present invention.

The flowchart of FIG. 5 illustrates an example of a fuel pressure reduction process in which the amount of injection at each injection after stopping of the pump is changed depending on target fuel pressure PFTG.

In the flowchart of FIG. 5, the processes of ECM 31 from step S601 to step S607 are the same as those from step S501 to step S507 in the flowchart of FIG. 2, and the processes of ECM 31 in step S608 and subsequent steps differ from those in step S508 and subsequent steps in the flowchart of FIG. 2.

In step S608, to increase the amount of fuel injected at each injection operation of fuel injection valve 3 with fuel pump 12 stopped as target fuel pressure PFTG in a stop period decreases, ECM 31 sets a pulse width of an injection pulse signal with fuel pump 12 stopped at a larger value as target fuel pressure PFTG decreases.

As will be described later, the number of injections of fuel injection valve 3 with fuel pump 12 stopped is provided as a fixed value, and thus, an increase in the injection amount at each injection operation can increase the total amount of fuel injection with fuel pump 12 stopped so that the fuel pressure further decreases.

That is, a correlation between target fuel pressure PFTG and the injection pulse width in step S608 is previously adjusted so that suppose the cumulative number of fuel injections is a constant value, the fuel pressure can be reduced from a fuel pressure before stopping of the engine to target fuel pressure PFTG in a stop period of the engine.

The injection pulse width that is set variable depending on target fuel pressure PFTG is set within a range in which ignition and combustion are caused by a spark from ignition plug 6.

Then, ECM 31 proceeds to step S609 and sets the injection pulse width set in step S608, as a value for use in injection control of fuel injection valve 3.

Thereafter, ECM 31 proceeds to step S610 and determines whether the cumulative number of fuel injections after stopping of driving of fuel pump 12 has reached target injection number INJCNT that is a previously stored fixed value or not.

At this time, if the cumulative number of fuel injections after stopping of driving of fuel pump 12 is smaller than target injection number INJCNT, that is, if it is estimated that an actual fuel pressure has not decreased to target fuel pressure PFTG, ECM 31 returns to the process of step S609 to continue fuel injection depending on the injection pulse width set in step S608.

On the other hand, when the cumulative number of fuel injections after stopping of driving of fuel pump 12 reaches target injection number INJCNT, ECM 31 estimates that the fuel pressure in the fuel pipe has decreased to target fuel pressure PFTG, and finishes a process concerning fuel supply in stopping internal combustion engine 1, that is, a fuel pressure reduction process, by stopping fuel injection.

As described above, in the case where the amount of fuel injected by each injection operation of fuel injection valve 3 with fuel pump 12 stopped is set variable, effects and advantages similar to those in a case where the cumulative number of fuel injections with fuel pump 12 stopped is set variable can be obtained.

In a configuration in which the injection pulse width in a stop period of fuel pump 12 is set variable, even when the fuel temperature varies, a variation of a period from when the ignition switch is turned off to when internal combustion engine 1 actually stops can be reduced.

The cumulative number of fuel injections and the injection pulse width may be set variable depending on target fuel pressure PFTG.

Figure 6A:
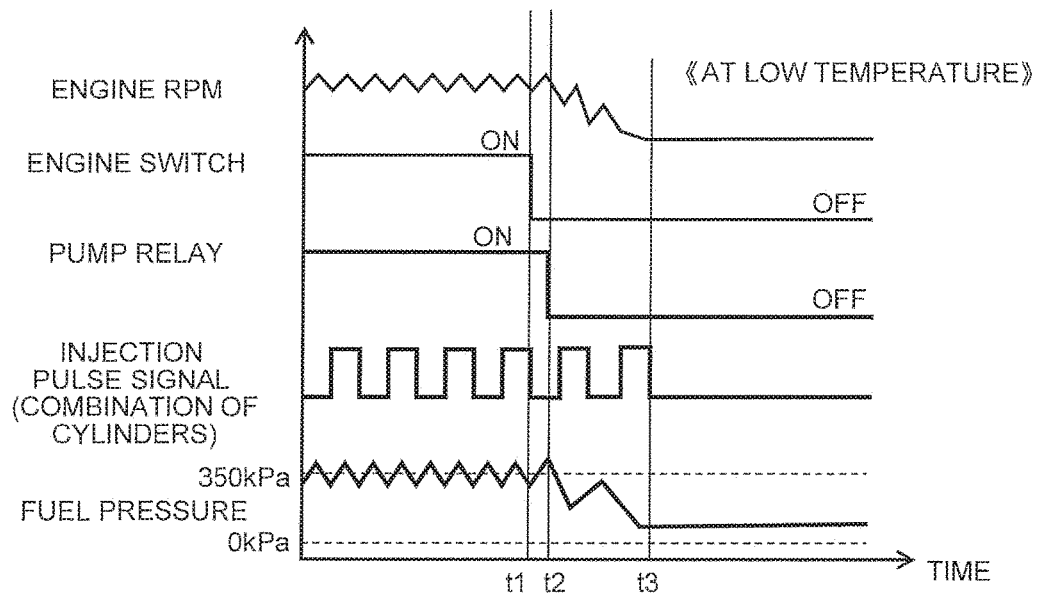
FIGS. 6A and 6B are time charts for describing process characteristics in stopping the internal combustion engine according to the embodiment of the present invention.
Figure 6B:
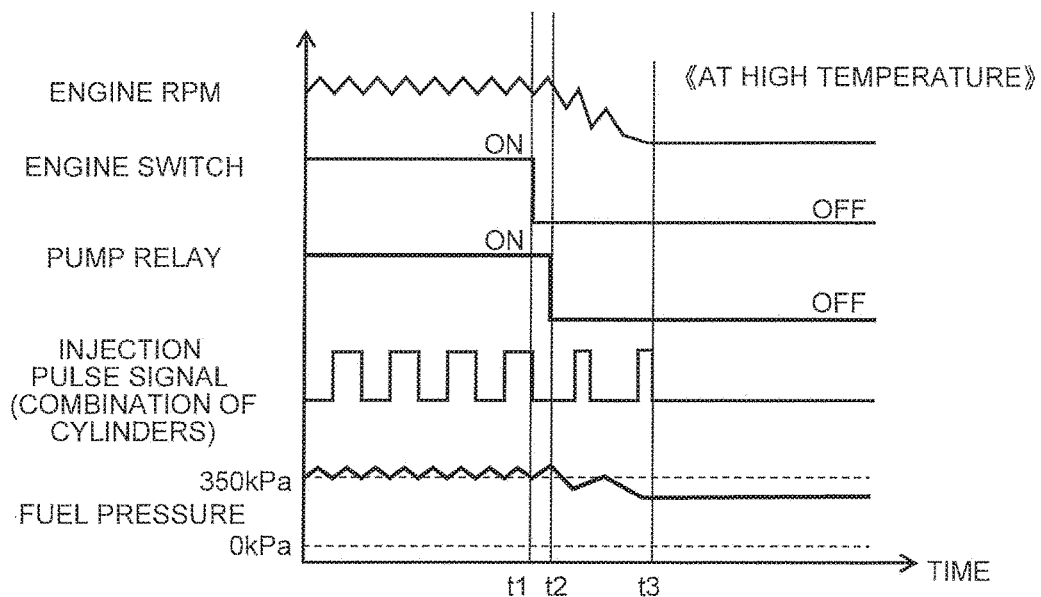

The time charts of FIGS. 6A and 6B illustrate examples of changes in an engine rotation speed, an ignition switch, a pump power supply relay, an injection pulse signal, and a fuel pressure in a case where processes indicated in the flowchart of FIG. 5 are performed by ECM 31. FIG. 6A illustrates an example of a characteristic in a state where the fuel temperature is lower than that in FIG. 6B. FIG. 6B illustrates an example of a characteristic in a state where the fuel temperature is higher than that in FIG. 6A.

In FIGS. 6A and 6B, when the ignition switch is switched from on to off at time t1 and a stop request of internal combustion engine 1 is issued, the pump power supply relay is switched from on to off at time t2, and then, an output of an injection pulse signal is stopped at time t3 so that fuel injection by fuel injection valve 3 is stopped.

That is, in a period from time t2 to time t3, fuel injection by fuel injection valve 3 is performed with fuel pump 12 stopped. In this period, the fuel pressure gradually decreases from a level around a target fuel pressure. Here, even in a case where the cumulative number of fuel injections in the stop state of fuel pump 12 is set as a fixed value and the fuel temperature varies, the number of injections in the period from time t2 to time t3 is the same. Note that since the injection pulse width in the stop state of fuel pump 12 is set at a larger value as the fuel temperature decreases, in a case where the fuel temperature is low with the same number of injections, the total amount of injection in the stop state of fuel pump 12, that is, the period from time t2 to time t3, increases so that the fuel pressure more greatly decreases.

Then, when fuel injection is stopped at time t3, the decrease of the fuel pressure converges, and the fuel pressure is kept around the fuel pressure at time t3 in a subsequent operation stop period of internal combustion engine 1.

In the process illustrated in the flowchart of FIG. 2, ECM 31 sets target fuel pressure PFTG in the stop period depending on the fuel temperature and sets the cumulative number of fuel injections after stopping of the pump depending on target fuel pressure PFTG. Alternatively, instead of the cumulative number of fuel injections, an injection duration time from when fuel pump 12 is stopped to when fuel injection is stopped may be set variable depending on target fuel pressure PFTG.

Figure 7:
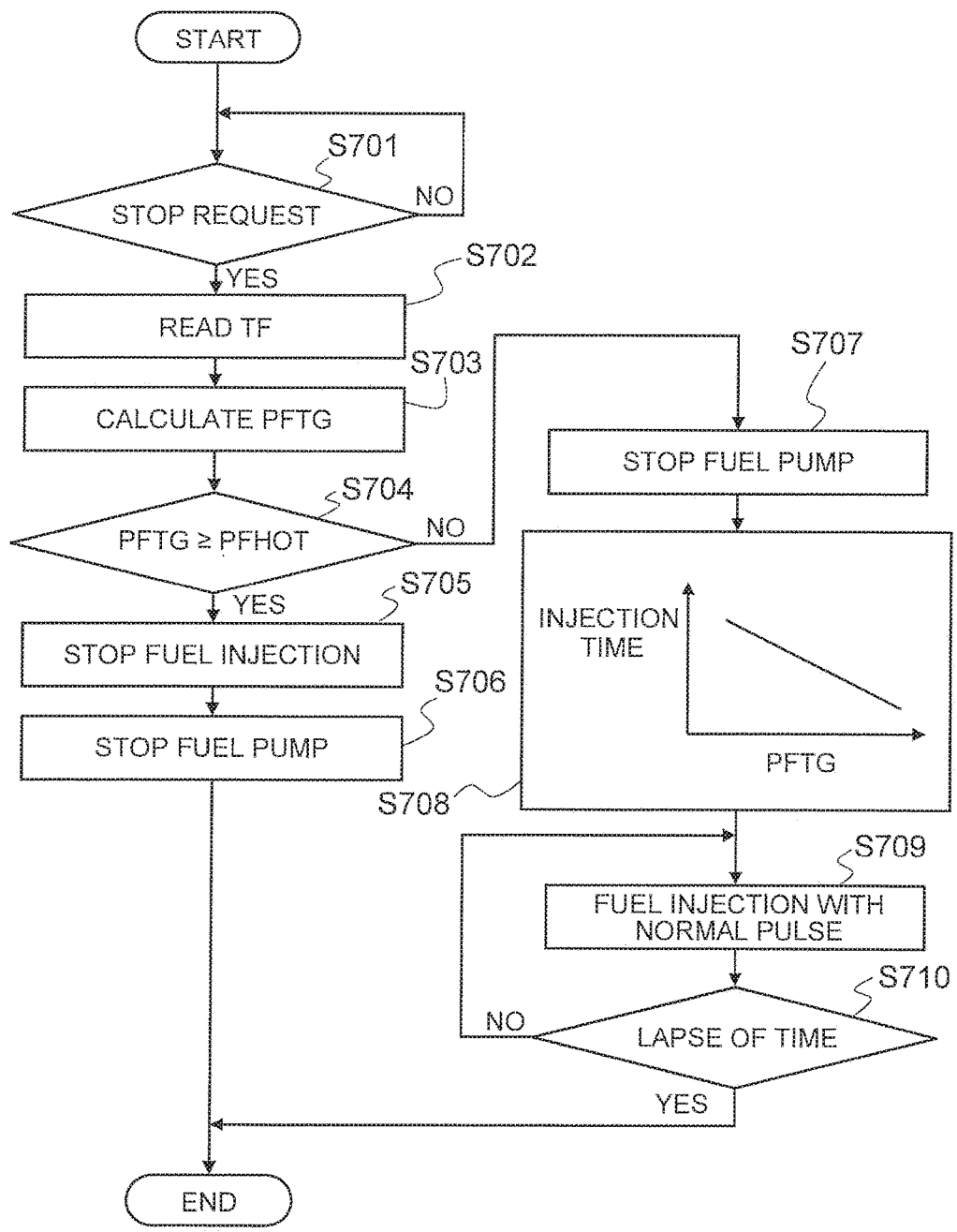
FIG. 7 is a flowchart of a process in stopping the internal combustion engine according to the embodiment of the present invention.

The flowchart of FIG. 7 indicates an example of a fuel pressure reduction process to which the injection duration time from when fuel pump 12 is stopped to when fuel injection is stopped is set variable depending on target fuel pressure PFTG.

In the flowchart of FIG. 7, the processes of ECM 31 from step S701 to step S707 are the same as those from step S501 to step S507 in the flowchart of FIG. 2, and the processes of ECM 31 in step S708 and subsequent steps differ from those in step S508 and subsequent steps in the flowchart of FIG. 2.

In step S708, as target fuel pressure PFTG in the stop period decreases, ECM 31 sets the injection duration time in a pump stop state at a larger value. As the injection duration time increases, the cumulative number of fuel injections in this period increases, and the total amount of fuel injected in the injection duration period increases. As the total amount of fuel increases, the fuel pressure decreases. Thus, the fuel pressure can be reduced to target fuel pressure PFTG.

Subsequently, ECM 31 proceeds to step S709, and in a manner similar to that in the on state of the ignition switch, ECM 31 calculates injection pulse width TI based on engine operating conditions such as an intake air flow rate QA and an engine rotation speed NE so that fuel injection by fuel injection valve 3 is performed based on injection pulse width TI. Fuel injected from fuel injection valve 3 with fuel injection control in step S709 is ignited and burns in a combustion chamber of each cylinder by spark ignition performed with ignition control that continues after an engine stop request has issued.

In step S710, ECM 31 determines whether an elapsed time from stopping of driving of fuel pump 12 has reached the injection duration time set in step S708 or not.

Then, if the elapsed time from stopping of driving of fuel pump 12 has not reached the injection duration time set in step S708, ECM 31 returns to step S709 and continues fuel injection by fuel injection valve 3.

On the other hand, if the elapsed time from stopping of driving of fuel pump 12 has reached the injection duration time set in step S708, ECM 31 estimates that the fuel pressure in the fuel pipe has decreased to target fuel pressure PFTG and finishes a process concerning fuel supply in stopping internal combustion engine 1, that is, a fuel pressure reduction process, by stopping fuel injection.

As described above, in the configuration in which the injection duration time with fuel pump 12 stopped is set variable, effects and advantages similar to those in the case where the cumulative number of fuel injections with fuel pump 12 stopped is set variable can also be obtained.

In a configuration in which fuel injection is stopped after a lapse of an injection duration time with fuel pump 12 stopped, it is easy to determine an injection duration time, that is, the timing of finishing the fuel injection.

The injection duration time and the amount of injection at each injection operation may be set variable depending on target fuel pressure PFTG.

The present invention has been specifically described with reference to the preferred embodiment, but it is obvious for those skilled in the art that variations of the embodiment can be made based on the basic technical idea and teaching of the present invention.

For example, ECM 31 may reduce the injection pulse width in fuel injection after stopping of fuel pump 12 depending on an increase in the cumulative number of fuel injections or an elapsed time.

ECM 31 may set a target value of the cumulative number of fuel injections and a target value of an injection duration time depending on target fuel pressure PFTG, and after stopping of fuel pump 12, stop fuel injection at an earlier one of the timing when the cumulative number of fuel injections reaches the target value or the timing when the injection duration time reaches the target value.

ECM 31 may perform a learning control in which the fuel temperature or target fuel pressure PFTG when internal combustion engine 1 stops is stored beforehand, and based on the fuel pressure detected in restarting internal combustion engine 1, a correction between target fuel pressure PFTG and one of the cumulative number of fuel injections, the injection pulse width, or the injection duration time is modified in such a manner that the fuel pressure in an actual stop period approaches target fuel pressure PFTG.

ECM 31 enables learning of a correlation between the fuel temperature and target fuel pressure PFTG based on the discharge amount of unburned fuel in restarting internal combustion engine 1. Specifically, in a case where the discharge amount of unburned fuel in restarting is large, ECM 31 estimates that the amount of fuel leakage from the fuel injection valve is large and tries to further reduce the fuel pressure in a next stop period.

Based on the fuel pressure detected by fuel pressure sensor 33, ECM 31 can determine an injection stop timing of fuel injection valve 3 after stopping of fuel pump 12.

REFERENCE SYMBOL LIST

1 Internal combustion engine
3 Fuel injection valve
11 Fuel tank
12 Fuel pump
14 Pressure regulating valve
15 Fuel gallery pipe
16 Fuel supply pipe
17 Fuel return pipe
30 FPCM (fuel pump control module)
31 ECM (engine control module)
33 Fuel pressure sensor

The invention claimed is:

1. A control device for an internal combustion engine including a fuel injection valve and provided with an electric fuel pump that pumps fuel to the fuel injection valve, the control device comprising:
an injection control unit configured to
stop driving of the fuel pump when an ignition switch is switched from on to off, and then continue the fuel injection by the fuel injection valve for a predetermined duration time;
detect a temperature of the fuel when the ignition switch is switched from on to off; and
change at least one of a number of fuel injections by the fuel injection valve, a fuel injection amount in each injection operation by the fuel injection valve, or a duration time necessary for stopping fuel injection by the fuel injection valve so as to increase a total amount of fuel injected from the fuel injection valve after stopping of driving of the fuel pump when the detected temperature of the fuel is at a first temperature compared to when the detected temperature of the fuel is at a second temperature that is greater than the first temperature.

2. The control device for the internal combustion engine according to claim 1, wherein the injection control unit is configured to increase the number of fuel injections by the fuel injection valve after stopping of driving of the fuel pump when the detected temperature of the fuel is at the first temperature compared to when the detected temperature of the fuel is at the second temperature.

3. The control device for the internal combustion engine according to claim 1, wherein the injection control unit is configured to increase the fuel injection amount at each injection operation by the fuel injection valve after stopping of driving of the fuel pump when the detected temperature of the fuel is at the first temperature compared to when the detected temperature of the fuel is at the second temperature.

4. The control device for the internal combustion engine according to claim 1, wherein the injection control unit is configured to increase an injection duration time from when driving of the fuel pump is stopped to when fuel injection by the fuel injection valve is stopped when the detected temperature of the fuel is at the first temperature compared to when the detected temperature of the fuel is at the second temperature.

5. The control device for the internal combustion engine according to claim 1, wherein the injection control unit is configured to
set a target fuel pressure in a stop period of the internal combustion engine at a larger value when the detected temperature of the fuel is at the first temperature compared to when the detected temperature of the fuel is at the second temperature, and
change, depending on the target fuel pressure, at least one of the number of fuel injections by the fuel injection valve, the fuel injection amount at each injection by the fuel injection valve, or the duration time necessary for stopping fuel injection by the fuel injection valve.

6. The control device for the internal combustion engine according to claim 5, wherein the injection control unit is configured to
set, depending on the target fuel pressure, a target number of fuel injections by the fuel injection valve and a target duration time necessary for stopping fuel injection by the fuel injection valve, and
stop fuel injection by the fuel injection valve at an earlier one of a timing when the number of fuel injections after stopping of driving of fuel pump reaches the target number or a timing when the duration time after stopping of driving of the fuel pump reaches the target duration time.

7. The control device for the internal combustion engine according to claim 5, wherein the injection control unit is configured to change at least one of a correlation between the target fuel pressure and the number of fuel injections, a correlation between the target fuel pressure and the fuel injection amount at each injection, or a correlation between the target fuel pressure and the duration time necessary for stopping fuel injection, based on at least a fuel pressure in restarting the internal combustion engine and the target fuel pressure.

8. The control device for the internal combustion engine according to claim 5, wherein the injection control unit is configured to change a correlation between the temperature of fuel when the ignition switch is switched from on to off and the target fuel pressure based on an exhaust amount of unburnt fuel in restarting the internal combustion engine.

9. A control method for an internal combustion engine including a fuel injection valve and provided with an electric fuel pump that pumps fuel to the fuel injection valve, the method comprising:
stopping driving of the fuel pump when an ignition switch is switched from on to off;
detecting a temperature of fuel when an ignition switch is switched from on to off;
setting, as a target value, at least one of a number of fuel injections by the fuel injection valve, a fuel injection amount at each injection by the fuel injection valve, or a duration time necessary for stopping fuel injection by the fuel injection valve so as to increase a total amount of fuel injected from the fuel injection valve after stopping of driving of the fuel pump when the detected temperature of the fuel is at a first temperature compared to when the detected temperature of the fuel is at a second temperature that is greater than the first temperature; and continuing fuel injection by the fuel injection valve depending on the target value, after stopping of the driving of the fuel pump.

\* \* \* \* \*